United States Patent Office 3,163,506
Patented Dec. 29, 1964

3,163,506
PREPARATION OF ORGANIC MONOBORATE SALTS
Howard Steinberg, Fullerton, and Don L. Hunter, Long Beach, Calif., Maurice H. Pickard, Oakdale, N.Y., and Lowell L. Petterson, Whittier, Calif., assignors to United States Borax & Chemical Corporation, Los Angeles, Calif., a corporation of Nevada
No Drawing. Original application Feb. 19, 1959, Ser. No. 794,229. Divided and this application Mar. 2, 1961, Ser. No. 92,784
3 Claims. (Cl. 44—76)

This application is a division of our application bearing Serial No. 794,229, filed February 19, 1959, and now abandoned.

This invention relates as indicated to a method for making organic monoborate salts and has particular reference to the preparation of the alkali metal and alkaline earth metal salts of glycol monoborates.

Sodium and potassium salts of various glycol monoborates have been known to those skilled in the art for a long time. However, these materials have found little or no use in industry due to the fact that methods for obtaining the salts in substantially pure form have been costly, inefficient or difficult. Consequently the salts of glycol monoborates have not been exploited and their valuable properties have gone unknown to industry.

We have found that the alkali metal and alkaline earth metal salts of glycol monoborates have unique solubilities and other properties which make them particularly desirable as additives in a number of organic media. For example, these salts impart alkalinity and are particularly effective as anti-corrosion agents in organic hydraulic brake fluids. The sodium salt of glycol monoborate does not support combustion and can be used to impregnate resins to give increased heat or flame resistance. Present day jet aircraft flying at high altitudes have encountered a severe problem with icing of their fuel and present anti-icing agents such as ethylene glycol and methanol have failed to overcome this difficulty. We have found that the salts of the glycol monoborates are soluble in jet fuels and prevent icing. Still further we have found that these salts of the glycol monoborates when added to gasoline act as an anti-knock agent, increase the octane rating, and additionally aid in preventing pre-ignition of the gasoline.

It is therefore the principal object of this invention to provide a method for making the alkali metal and alkaline earth metal salts of glycol monoborates which method is economically desirable and provides good yields of substantially pure salts.

It is a further object of this invention to provide compositions of gasoline, jet fuels, brake fluids, resins, etc., with the alkali metal and alkaline earth metal salts of glycol monoborates.

To the accomplishment of the foregoing and related ends, the invention then comprises the features hereinafter fully described and pointed out in the claims, the following description setting forth in detail certain illustrative embodiments of the invention, these being indicative, however, of but a few of the many ways in which the principle of the invention may be employed.

Broadly stated, the present invention comprises the method of making the alkali metal and alkaline earth metal salts of glycol monoborates which comprises reacting a metal selected from the group consisting of the alkali metals and alkaline earth metals with an excess of an alcohol having from 1–6 carbon atoms, reacting the resultant metal alkoxide with a glycol monoborate, said glycol monoborate having about a 1:1 mole ratio of boron to glycol and having the general formula:

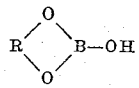

where R is an alkylene radical of 2–3 carbon atoms in length and containing from 2–10 carbon atoms.

In the above broadly stated paragraph we have said that the desired metal can be reacted with any alcohol having from 1–6 carbon atoms to form the alkoxide. It is important to note that the present invention fully intends to cover all such alcohols; however, due to the cost factor and speed of reaction, in the preferred embodiment of our invention we use methyl alcohol to form the desired metal methoxide. It is also important at this point to note that while all of the 1,2 and 1,3-glycols of from 2–10 carbon atoms are equally applicable to the present invention, for the sake of overall economy and speed of reaction, in the preferred embodiment of our invention we use hexylene glycol.

Thus, while in the following examples only methyl alcohol is used for illustrative purposes it will be clearly understood that it is only necessary to merely substitute in its stead any of the other defined alcohols to achieve comparable results.

I. Into a one liter three-necked round-bottomed flask equipped with a motor stirrer, a reflux condenser and a plug were added 300 ml. of absolute methanol and portion-wise with stirring 23 grams of metallic sodium. When the reaction was complete (clear solution), 144 grams of hexylene glycol monoborate dissolved in 200 ml. of methanol was added to the flask. Methanol was then stripped from the flask until only a solid residue remained. The cooled residue was removed from the flask and heated under vacuum at 180° C. for about 4 hours. Chemical analysis of the resultant sodium hexylene glycol monoborate revealed the following data:

Na=13.9% (theory 13.86%)
B=6.51% (theory 6.52%)

II. Methanol (500 ml.) was added to a one liter three-necked flask equipped with a stirrer, reflux condenser and a nitrogen inlet tube. The flask was surrounded by an ice-water bath and 39.1 grams of metallic potassium were added portion-wise to the methanol with stirring. When reaction was complete, 144 grams of hexylene glycol monoborate dissolved in 200 ml. of methanol was added. The methanol was stripped and the potassium hexylene glycol monoborate was dried as above. Chemical analysis gave the following data:

K=21.0% (theory 21.47%)
B=5.81% (theory 5.94%)

III. Into a one liter three-necked flask equipped with a motor stirrer, reflux condenser and a plug was added 250 ml. of methanol. To this was added with stirring 6.94 grams of metallic lithium in small portions. When the reaction was complete (clear solution, 144 grams of hexylene glycol monoborate in 200 ml. of methanol was slowly added. The solution was stripped of methanol under water aspirator vacuum until a viscous solution remained. The remaining material was then poured into aluminum trays and dried in a vacuum oven at 180° C. Heating under vacuum was continued until the material became a glassy solid. The glassy material was removed from the oven, pulverized and returned to the oven and heated under vacuum at 180° C. for about two more hours. The resultant lithium hexylene glycol monoborate analyzed as follows:

Li=4.65% (theory 4.68%)
B=7.21% (theory 7.22%)

IV. Absolute methanol (500 ml.) and 20.04 grams of metallic calcium were added to a one liter three-necked flask equipped with a stirrer, reflux condenser and a plug. The solution was stirred and refluxed for about four hours until all the calcium had reacted giving a white voluminous precipitate of calcium methoxide. The flask was allowed to cool slightly and 144 grams of hexylene glycol monoborate dissolved in 200 ml. of methanol was added dropwise. The reaction was exothermic and as the addition proceeded the precipitate of calcium methoxide disappeared leaving a substantially clear solution. The methanol was stripped and the remaining solid material dried as in the foregoing examples. The resultant calcium hexylene glycol monoborate assayed as follows:

Ca=12:51% (theory 12.27%)
B=6.37% (theory 6.64%)

V. Into a three-necked round-bottomed flask equipped with a motor stirrer, a reflux condenser and a plug was added one liter of absolute methanol. Metallic sodium (46 grams) was added portion-wise with continuous stirring until all the sodium had reacted and only a clear solution remained.

The plug was replaced by a pressure equalizing dropping funnel containing a solution of 231.9 grams of 1,3-butanediol monoborate in 200 ml. of absolute methanol. The monoborate solution was added dropwise to the sodium methoxide solution. When the addition was complete the excess methanol was stripped from the solution until a syrupy liquid remained. This residue was transferred to aluminum pans and dried in a vacuum drying oven at 180° C. under full pump vacuum until only a white brittle solid remained. The solid lumps were ground into a powder and then heated in the vacuum oven as above for about four hours. The resultant sodium 1,3-butanediol monoborate on analysis for sodium and boron showed:

Na=16.50% (theory 16.68%)
B=7.80% (theory 7.85%)

VI. Using the apparatus of the foregoing examples, 69 grams of metallic sodium was allowed to react with 1000 ml. of absolute methanol. The resultant sodium methoxide was reacted with 305.7 grams of 1,2-propanediol monoborate dissolved in 250 ml. of absolute methanol. The resultant sodium 1,2-propanediol monoborate assayed as follows:

Na=18.50% (theory 18.56%)
B=8.69% (theory 8.73%)

VII. Into a two liter three-necked flask equipped with a motor stirrer, reflux condenser and plug was introduced 1000 ml. of absolute methanol and 23 grams of metallic sodium with stirring. When the sodium methoxide reaction was completed (clear solution), 172.1 grams of 2,2,4-trimethyl-1,3-pentanediol monoborate was introduced. The excess methanol was stripped and the residue dried as in the foregoing examples. The resultant sodium 2,2,4-trimethyl-1,3-pentanediol monoborate was a white powdery solid which assayed as follows:

Na=11.83% (theory 11.85%)
B=5.56% (theory 5.58%)

The alkali metal and alkaline earth metal glycol monoborates, as stated previously, have found particular utility in various organic compositions. For example, sodium hexylene glycol monoborate when added to brake fluids in amounts of from about 0.2 to about 10% by weight acts as an excellent anti-corrosion agent. It is generally accepted by those skilled in the art that metal-organo salts are substantially insoluble in organic solvents. The sodium and calcium hexylene glycol monoborates show remarkable solubilities in various organic solvents including gasoline; for example, sodium hexylene glycol monoborate is about 12% by weight soluble in gasoline and the calcium salt is about 15% by weight soluble in gasoline. These salts when added to gasoline in amounts of from about .01% to about 1.5% will increase the octane rating and aid in preventing pre-ignition.

A very serious condition confronting jet aircraft has been icing of the fuel during flight resulting in engine failure. It has been found that ethylene glycol and methanol when added to jet fuel, known to those skilled in the art as "JP-4," come out of solution and do not overcome the problem of icing of the fuel. We have found that amounts of from about .01 to about 1.0% of sodium hexylene glycol monoborate when added to jet plane fuel will prevent icing of the fuel. Amounts of this salt added to the jet aircraft fuel on the order of about .01% by weight will prevent icing down to a temperature of about −62° C., which is the freezing point of the fuel itself.

Other modes of applying the principle of the invention may be employed provided the features stated in any of the following claims or the equivalent of such be employed.

We, therefore, particularly point out and claim as our invention:

1. A motor gasoline to which has been added about 0.01 to about 1.5% by weight of a material selected from the group consisting of the alkali and alkaline earth metal salts of the glycol monoborates, said glycol monoborate having about a 1:1 mole ratio or boron to glycol and having the general formula

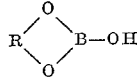

where R is an alkylene radical of 2–3 carbon atoms in length and containing from 2–10 carbon atoms, said salts having been so prepared that when employed in said range of percent by weight they are substantially entirely soluble in said gasoline.

2. The composition of claim 1 wherein said additive is sodium hexylene glycol monoborate.

3. Petroleum hydrocarbon jet fuel to which has been added from about 0.01% to about 1.0% by weight of sodium hexylene glycol monoborate, said glycol monoborate having been so prepared that when employed in said range of percent by weight it is substantially entirely soluble in said hydrocarbon jet fuel.

References Cited by the Examiner
UNITED STATES PATENTS

| | | | |
|---|---|---|---|
| 2,914,481 | 11/59 | Taylor | 252—74 |
| 2,931,714 | 4/60 | De Gray | 44—63 |
| 2,958,591 | 11/60 | Jones | 44—56 D |
| 2,965,582 | 12/60 | Visnapuu | 44—69 |
| 2,979,524 | 4/61 | Wright et al. | 260—462 |
| 2,982,733 | 5/61 | Wright et al. | 252—78 |
| 3,035,887 | 5/62 | Willcockson | 252—49.7 X |

DANIE E. WYMAN, Primary Examiner.

JULIUS GREENWALD, Examiner.